Sept. 16, 1930.    C. PETERSON    1,776,082
SPRING FORMING DEVICE
Filed July 26, 1926    3 Sheets-Sheet 3
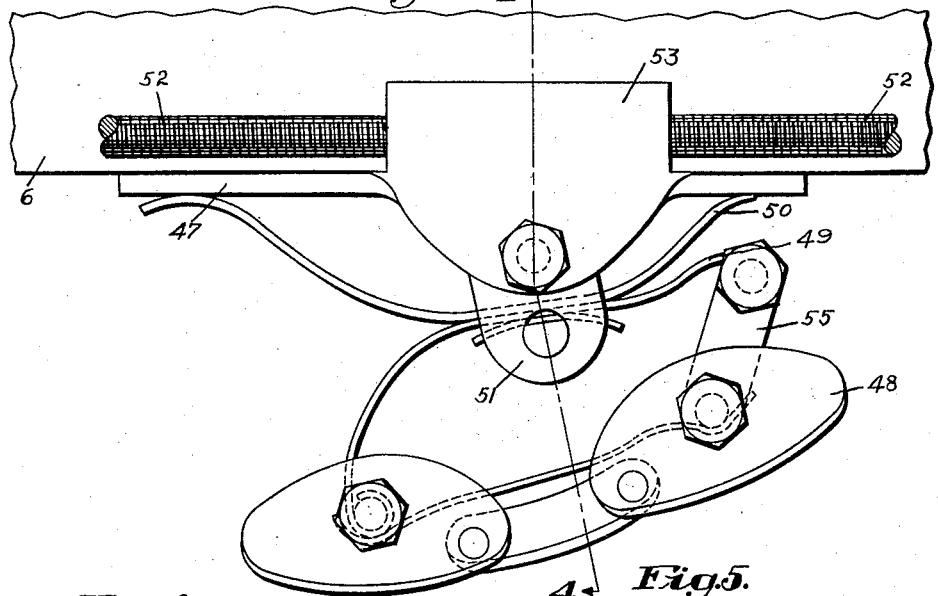
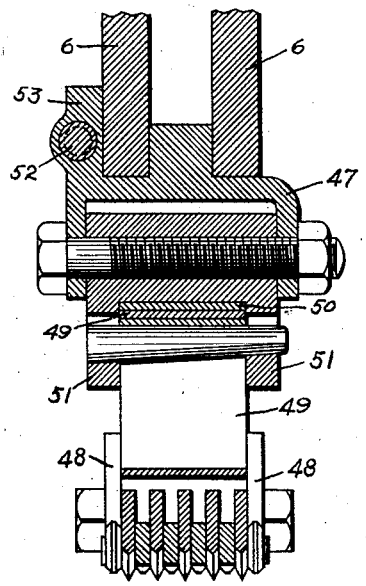
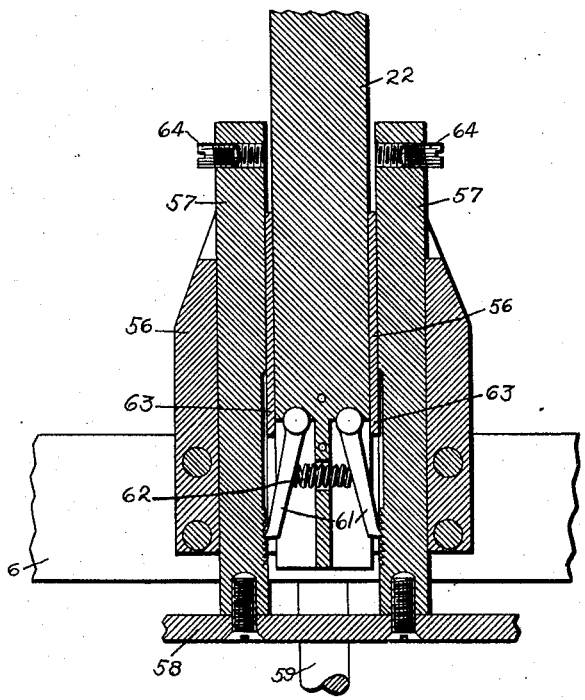
Inventor:
Carl Peterson Patented Sept. 16, 1930

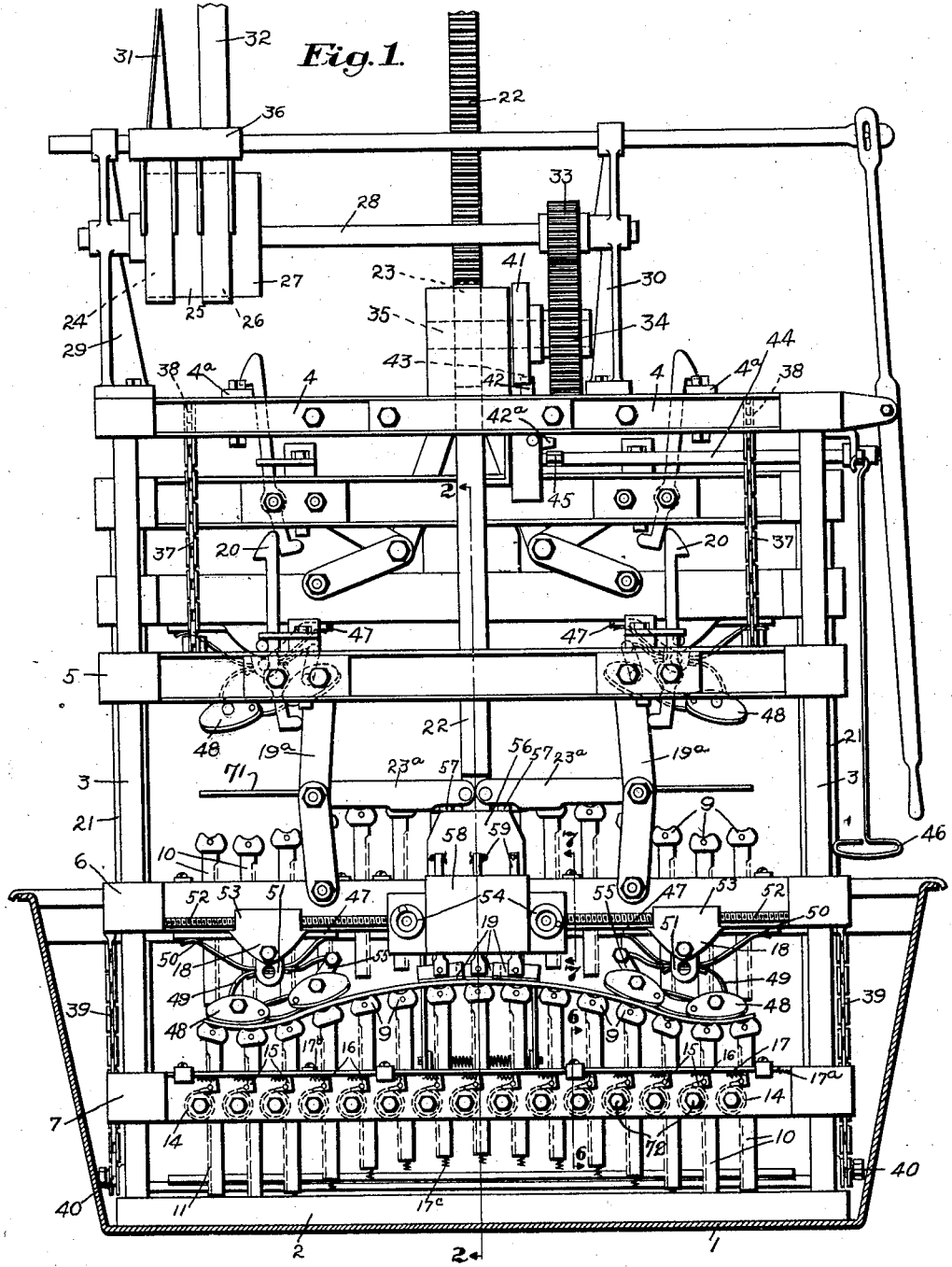

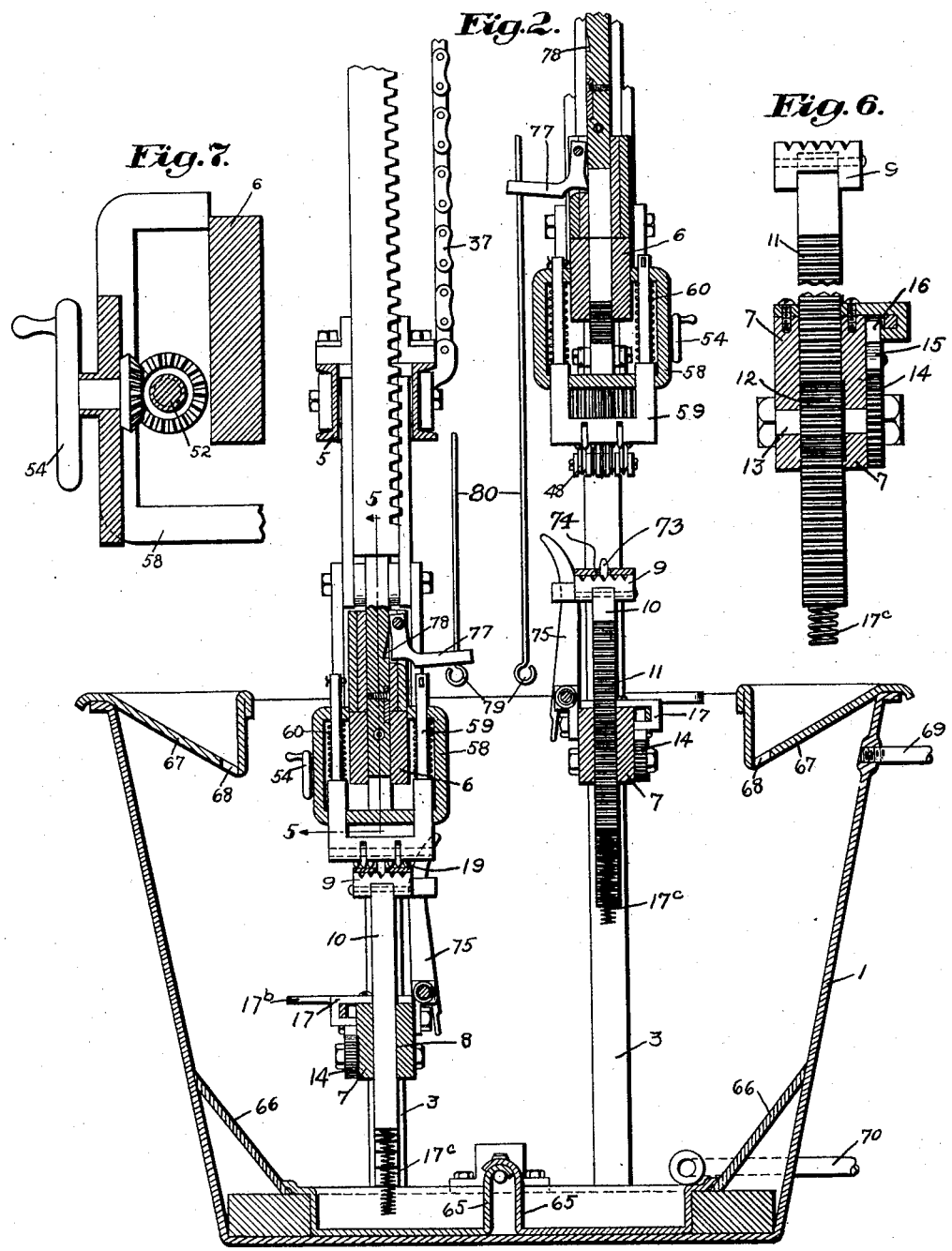

1,776,082

UNITED STATES PATENT OFFICE

CARL PETERSON, OF JAMAICA PLAIN, MASSACHUSETTS, ASSIGNOR TO GEORGE LAWRENCE, OF CAMBRIDGE, MASSACHUSETTS

SPRING-FORMING DEVICE

Application filed July 26, 1926. Serial No. 125,113.

This invention aims to provide improvements in a spring-forming and spring-tempering device particularly adapted for making spring leaves either for quantity production or for repair work. The claims in this application are directed to the spring-forming device.

Reference is hereby made to a divisional of this application Serial No. 234,126, filed November 18, 1927, the claims of which are directed to the combination of the spring-forming and tempering device.

In the drawings, which illustrate a preferred embodiment of my invention:—

Figure 1 is a front elevation of the machine, showing the tank in cross-section, one spring-forming device being in position for tempering a spring leaf and another device in position for receiving and forming a heated spring leaf;

Fig. 2 is a section on the line 2—2 of Fig. 1;

Fig. 3 is an enlarged elevation view of a spring-pressing member showing a portion of the cross-bar and adjusting screw;

Fig. 4 is a section on the line 4—4 of Fig. 3;

Fig. 5 is an enlarged section on the line 5—5 of Fig. 2;

Fig. 6 is an enlarged section on the line 6—6 of Fig. 1, showing the locking means and adjusting means for the die members; and Fig. 7 is an enlarged section on the line 7—7 of Fig. 1, showing the means for adjusting one of the flexible spring-pressing members.

Referring to the embodiment of my invention illustrated by the drawings, I have shown a machine for forming and tempering leaf springs, and particularly, though not exclusively, leaf springs for use on all kinds of vehicles. The machine as illustrated in Fig. 1 includes an oil tank 1, into which is placed a frame, supporting the working parts of the machine. The frame has a base 2 resting upon the bottom of the tank 1, upright posts 3 at the sides and a top part 4, which ties the posts 3 together. These posts 3 provide guides for three sliding cross-bars 5, 6 and 7, the purposes of which are to provide supports for various parts which form the means for bending the spring leaves into a desired form.

The lower cross-bar 7 carries the die means against which the spring leaf may be pressed and is provided with a plurality of grooves 8, in which are guided a series of vertically adjustable die members 9. These die members are pivotally mounted upon stems 10, provided with rack teeth 11, cooperating with pinions 12, as shown in Fig. 6. The pinions are carried by rotatable shafts 13 mounted in the cross-bar 7. At the outer end of each shaft 13, I have provided a ratchet wheel 14 cooperating with a spring-actuated pawl 15 mounted upon the cross-bar 7. Thus, I have provided means whereby each die member is locked against downward movement when pressure is applied thereto, while being readily adapted to move upwardly and held in any position to which it may be elevated. Each pawl has a finger portion 16 which enters a slot in a slidable pawl shifting lever 17 normally moved in one direction by a spring $17^a$. The shifting lever may be operated by means of the handle $17^b$ to release all of the pawls at one time so that the die members 9 may automatically drop, by gravity, against spring bumper means $17^c$ located below the ends of the stems 10 so that the die members may not strike against the upper face of the cross-bar 7.

The middle cross-bar 6 supports the means for pressing the spring leaf against the dies 9. The means illustrated in the drawings include two longitudinally movable self-adjusting members 18, 18 adapted to act upon the end portions of the spring leaf, as shown in Fig. 1, and a plurality of spring-pressed pivotally supported jaw members 19 adapted to press against the central portion of the spring leaf. The spring-engaging portions of the members 18 and 19 are formed from a plurality of relatively short thin links spaced apart and having a narrow edge so as to contact with as little of the surface of the spring as possible. The links are pivoted relative to each other so that they may conform substantially to the bend of the spring leaf.

The third cross-bar 5 is connected to the middle cross-bar 6 by a toggle link arrangement $19^a$, and has pivoted thereon a pair of latch members 20, 20 adapted to hook into engagement with the top plate $4^a$, for purposes more fully hereinafter described. The upper and lower cross-bars 5 and 7 are rigidly tied together by strips 21 in line with the uprights 3, Fig. 1, so that there can be no relative movement between these cross-bars. Thus the only relative movement between the cross-bars is the movement of the middle cross-bar 6, as will be hereinafter described in connection with the operation of the machine.

To actuate the toggle links which connect the cross-bars 5 and 6, I have provided a centrally located vertical sliding rack rod 22, guided in the top plate 4 and cooperating with a pinion 23. The toggle link arrangement 19ª is connected to the rack rod 22 by links 23ª and these links operate the toggle links to move the bar 6 when the rack bar is moved upwardly or downwardly as more fully hereinafter described.

Any suitable means may be provided for turning the pinion 23, but I have shown four pulleys 24, 25, 26 and 27 mounted upon a shaft 28 supported in bearing posts 29 and 30 bolted to the top plate 4 as shown in Fig. 1. The pulleys 24 and 27 may be driven by the belts 31 and 32, the other pulleys 25 and 26 merely being idle on the shaft 28. The shaft 28 also carries a pinion 33 which meshes with a gear 34 carried by the same shaft 35 which carries the pinion 23 for driving the rack rod 22. Suitable belt shift means 36 is shown supported in a convenient manner for shifting the belts when the operator wishes to drive the rack rod 22 in either an upward or a downward direction.

While thus far I have described a single mechanism which may be used for forming and tempering spring leaves, I have illustrated in Figs. 1 and 2, a machine which includes two of such mechanisms driven from the same driving means so that one spring leaf may be tempered while another spring leaf is being formed. Therefore two sets of uprights 3 are provided upon which are mounted two sets of cross-bars 5, 6 and 7 and the parts carried thereby, as above described.

By providing a "double machine," I not only speed up production and provide compactness, but one spring-forming mechanism balances the other and both operate together. To this end, I provide an upper set of chains 37 connected to the top cross-bars 5, 5 and operating around sprocket wheels 38 and a lower set of chains 39 connected to the lower cross-bars 7, 7 and operating on sprocket wheels 40, as shown in Fig. 1. These chains and sprocket wheels cooperate to move one unit up while pulling the other unit down during certain periods of operation of the machine which will be more fully hereinafter described.

In order to provide safety to the machine so that it cannot be operated accidentally while the operator is placing a spring leaf in position or positioning the die members 9, I have provided locking means for preventing operation of the driving mechanism. The locking means selected for illustration includes a notched wheel 41, carried by the shaft 35, and cooperating with a latch 42 which may spring into the notch 43 in the wheel 41 as shown in Fig. 1, thereby effectively preventing turning of the gears even though the belt shifter 36 should be operated. A rocker shaft 44 is mounted on the frame of the machine just beneath the top plate 4 and carries a cam 45 which engages the tail 42ª of the latch 42 so that, when the shaft is rocked by pulling upon the wire 46, the latch 42 may be released from the wheel 41 and the machine may be operated. If the operator moves the belt shifter 36 to move the belts 31 and 32 on to the pulleys 24 and 27 before pulling the wire 46 to release the latch 42, the belts 31 and 32 will merely slip around the pulleys 24 and 27 without driving them, because the safety locking means is strong enough to hold the driving means against rotation. After the machine has been started, the wire 46 may be released and the operation of the machine may continue until the latch again snaps into the notch 43.

Each of the self-adjusting members 18 is provided with a block 47 slidably mounted at the lower side of the cross-bar 6, a shoe 48 suspended from the block by springs 49 and 50 secured to a link 51 pivoted upon the block. The means for sliding each member 18 includes a threaded shaft 52 passing through an ear 53 at the side of the block and a hand wheel 54 connected through suitable gearing as shown in Fig. 7, to the shaft 52. Each shoe 48 is made up of a number of links secured together so that the shoe is more or less flexible and may conform with the dies 9 when pressing a spring leaf thereagainst, as above described. The springs 49 and 50 are in the form of spring leaves and are so arranged that the shoe 48 is normally held in an angular position with the outer end of the shoe tipped downwardly. One of the ends of the spring 49 is secured to the shoe 48 while the other end is secured to one end of a link 55. The other end of the link is pivoted at the inner end of the shoe 48, as shown in Fig. 3. The free ends of the spring 50 bear against the under side of the block 47 and may slide against the block during the pressing operation of forming the spring leaf, as hereinafter described.

Referring now to Fig. 5, which shows a cross-section through the block 56 mounted on the cross-bar 6, I have shown a pair of sliding parts 57, 57 carrying a part 58 which supports the yokes 59 upon which the members 19 are pivoted, as shown in Figs. 1 and 2. The yokes 59 are slidable in the part 58 and springs 60 (Fig. 2) are provided to normally press the yokes downwardly. The lower end of the rack rod 22 is also guided in the block 56 and carries a pair of pawls 61, 61 pivotally mounted in slots cut in the sides of the rod adjacent its end, as shown in Fig. 5. These pawls 61, 61 are normally pressed outwardly by a spring 62, so that when they are free from the edges 63, 63 of the block 56, they may engage teeth cut in the sliding parts 57, 57 in the manner and for the purposes hereinafter described in connection with the operation of the machine. Stop pins 64, 64 are provided at the upper ends of the sliding parts 57, 57 to limit the downward movement of the part 58.

The tank 1, as best indicated in Fig. 2, has a pair of removable pans 65, 65 located in the space between the edges of the base 2 beneath the forming mechanism to catch any scale or dirt which may drop from the spring leaves or other parts of the machine into the oil. Side plates 66 are provided to direct the scale or dirt from the sides of the tank into these pans. Thus the tank may be readily and quickly cleaned at any time by drawing off the oil and removing and cleaning the pans and sides. At the upper front and rear edges of the tank, I provide shelves 67, 67 upon which the spring leaves may be placed either before or after forming and tempering, and holes 68 are provided therein so that the oil from the spring leaves may drain back into the tank.

When operating the machine, the oil is kept cool by circulation and this is done by drawing the oil through the pipe 69 at the top of the tank, cooling it, and passing it back to the tank through the pipe 70 at the bottom of the tank.

In illustrating the machine, I have shown in Figs. 1 and 2, two positions of the means for pressing the spring leaves. The front mechanism, as viewed in Fig. 1, shows a spring leaf pressed to the desired form and submerged in the oil bath in the tank. The rear mechanism is shown in position for adjusting the die members 9 and for receiving the hot spring leaf 71. In the position of the parts of the machine as shown in Fig. 1, the machine is locked so that it cannot be operated accidentally while the operator is adjusting the die members 9 or placing the spring leaf 71 in position.

Assuming that the parts of the machine are in the positions shown in Figs. 1 and 2, the operation is as follows: First, the operator adjusts the die members 9 to the desired form to which the spring leaf is to be bent. For this purpose a templet may be used, if desired, and a rough adjustment of the dies 9 may be made by lifting them by hand. However, to secure a fine adjustment of a die member, it is preferable to turn the shaft 13, to which the ratchet wheel 14 and gear 12 are secured, by the use of a socket wrench which may be engaged over a nut 72 at the end of the shaft 13. When the dies 9 are set to the proper form for the spring leaf, as shown by the mechanism at the rear of the machine (Figs. 1 and 2), the hot spring leaf 71 may be placed in position over the die members as shown. The center die member is provided with a pin 73 (Fig. 2), which passes through the bolt hole 74 in the spring to provide centering means for the leaf, and spring-pressed spring-engaging fingers 75 mounted on the cross-bar 7 press against the edges of the leaf to keep it in alignment with the die members or templet as shown in Figs. 1 and 2. When leaves are being formed without a center bolt hole, the center die member may be replaced by a plain die member as the pin 73 would interfere in forming a spring without a bolt hole.

After turning the hand wheels 54 to adjust the members 18 to their proper positions over the end portions of the spring, the next operation of the machine is the movement of the cross-bar 6 toward the cross-bar 7. This movement of the bar 6 will press the spring-pressing members 18 and 19 against the spring leaf 71, and force it (while hot) to assume the form to which the dies 9 have been adjusted. This operation may be effected by pulling downwardly on the wire 46 to release the locking means, and then moving the handle of the belt shifter so as to shift the belts 31 and 32 onto the pulleys 24 and 26 as shown in Fig. 1, thereby to turn the shaft 28 and operate the various gears which supply the motive power for moving the rack rods 22. The latches 20, being hooked into engagement with the top plate 4$^a$, prevent downward movement of the cross-bar 5, and the cross-bar 7, being rigidly connected to the bar 5 by the strips 21, is therefore also initially held against movement. Therefore the initial downward movement of the rack rod 22 will operate through the links 23$^a$ to straighten the toggle links 19$^a$ and move the bar 6 toward the bar 7. During this movement, the shoes 48 of the members 18 and the members 19 are brought into contact with the spring leaf 71 at substantially the same time. As the bar 6 continues toward the bar 7, the shoes 48 of the members 18 press the outer ends of the spring leaf 71 against the dies 9. The action of these members 18 is a crawling or creeping one because of the peculiar arrangement of the springs 49 and 50 and the angle of the shoe 48. Thus, as the spring leaf 71 becomes more and more compressed, the shoes 48 move toward the ends of the spring 71, and draw the spring leaf 71 outwardly from the center so that it will conform with the dies 9 and thereby prevent any bulging action between the members 18 and 19. Further downward movement of the rack rod 22, which up to this time has been sliding freely in the block 56, moves the pawls 61 (Fig. 5) past the corners 63 so that they may engage the teeth on the sliding parts 57 as shown. Upon continued movement of the rack rod 22 after engagement of the pawls 61, the part 58 is forced downwardly, thereby compressing the springs 60 surrounding the yokes 59 and pressing the jaw members 19 firmly against the central portion of the spring leaf 71 and holding it firmly against the dies 9.

The lost motion between the rack rod 22 and the jaw members 19 provided by the springs 60 after the pawls 61 are engaged with the teeth on the sliding parts 57, permits releasing of the latches 20 after the spring leaf 71 has been compressed to its proper form against the die members 9. The releasing action is effected by engagement of the toggle links 19a with the lower portions 76 of the latch members 20 to swing the latches about their pivots and release them from engagement with the top plate 4a of the machine.

Just prior to the release of the pawls 61, the locking pawl 77, pivoted at the back of the block 56, may engage a notch 78 cut into the rack bar 22, as shown in Fig. 2, so that when the pawls 61 are released the parts are held in clamped position and cannot be released until the pawl 77 is withdrawn from the notch 78. When the cross-bars reach their lowest position in the tank 1, the pawl 77 is released by the eye 79 at the end of the rod 80, which passes through a hole in the pawl member 77 as shown in the mechanism at the left in Fig. 2. Thus when the mechanism at the right is operated to clamp a heated spring leaf, the cross-bar 6 may be raised while the cross-bar 7 and spring remain in the tempering bath in the tank 1.

During the period of pressing the spring leaf 71 at the rear of the machine, the rack rod 22 for the front mechanism would be raised thereby releasing the spring-pressing mechanism but allowing the spring leaf to remain in the oil all during this period.

After the latch members 20 for the rear mechanism are released, further rotation of the pinion 23 will act upon the rack rod 20 at the rear to force the cross-bars 5, 6 and 7, as a unit, downwardly into the tank 1 so that the spring leaf 71 may be submerged in the oil thereby to become tempered and cooled.

The front and rear mechanisms being secured by the chains 37 and 39, the downward movement of one mechanism will pull the other mechanism up out of the oil so that the operator may take the spring leaf from the form and lay it upon the shelf 67 (Fig. 2) to drain while placing a new leaf in position to be formed. The operation then continues as described.

With the machine described, any number of spring leaves may be formed exactly alike or the dies 9 may be easily and quickly reset to make a different leaf at each operation of the machine. Thus the machine is equally useful for production work or for repair work.

The peculiar arrangement and formation of the parts which are used to form the spring leaves are simple in construction and operation and are adapted to be so arranged that spring leaves of various curves and angles may be made without changing any of the parts of the machine.

While I have shown and described a preferred embodiment of my invention, it should be understood that I do not wish to be limited to the particular arrangement and formation of parts, my invention being best defined in the following claims.

Claims:

1. A spring-forming device including means providing a form to which a spring leaf may be shaped, and a plurality of flexible spring-pressing members each independent of the other and resilient supports upon which said spring-pressing members are mounted to permit each member independently to press a portion of the spring leaf against the said form, thereby to form spring leaves of various shapes by means of the same flexible spring-pressing members.

2. A spring-forming device including means providing an adjustable form to which a spring leaf may be shaped, a plurality of self-adjusting resiliently mounted spring-pressing members, and means for adjusting said members toward and away from each other, each member adapted to press a portion of the spring leaf against said form independently of the form which the other member or members may assume and each member adapted to conform substantially with said form when the spring leaf is fully compressed.

3. A spring-forming device including means providing an adjustable form to which a spring leaf may be shaped, a plurality of self-adjusting resiliently mounted spring-pressing members, and means for adjusting said members toward and away from each other, each member adapted to make an outwardly sliding contact with the spring leaf as the leaf is pressed against the form thereby to prevent any bulging action of the spring during the forming operation of said device.

4. A spring-forming device comprising, in combination, a frame, a pair of sliding cross-bar members movable together or separately relative to said frame, a number of closely arranged die-presenting members independent of each other and carried by one of said sliding crossbar members having die members pivotally mounted thereon, said die-presenting members being independently adjustable relative to the crossbar by which they are carried whereby a desired form for a spring leaf may be provided and self-adjusting spring leaf pressing means carried by the other of said sliding members whereby the spring leaf may be pressed tightly against the form provided by the pivoted die members carried by the first mentioned sliding crossbar member thereby to press the spring leaf into the desired form.

5. A spring-forming device including means providing an adjustable form to which a spring leaf may be shaped, resiliently supported jaw means for engagement with the central portion of the spring and a resiliently mounted member at each side of said jaw means tipped at an angle so as to make a sliding contact with the spring leaf thereby to prevent bulging of the leaf at the spaces between the jaw means and resiliently mounted members.

6. A spring-forming device comprising, in combination, a frame, a pair of sliding cross-bar members movable together or separately relative to said frame, means carried by one of said sliding members and adjustable relative thereto whereby a desired form for a spring leaf may be provided and a plurality of self-adjusting members carried by the other of said sliding members and means carried by said frame for moving said other sliding member toward said first mentioned sliding member which is held stationary, thereby to press said spring leaf into the shape provided by said form.

7. A spring-forming device comprising, in combination, a frame, three cross-bar members mounted upon said frame, the middle cross-bar being adjustable relative to the other cross-bars and said other cross-bars being immovable relative to each other, operating means connected between one of said cross-bars and the middle bar to provide for the adjustment thereof and form-providing and spring-forming means provided between said middle cross-bar and one of the other of said bars to clamp a heated spring leaf therebetween when said operating means is straightened.

8. A spring-forming device comprising, in combination, a frame, three sliding cross-bar members mounted upon said frame, the middle cross-bar being movable relative to the other cross-bars and said other cross-bars being immovable relative to each other, toggle means connected between the top movable bar and the middle bar to provide for the adjustment thereof, a plurality of adjustable die members carried by the third cross-bar to provide any suitable form to which it is desired to press a spring leaf and resiliently mounted self-adjusting spring-pressing members acting independently of each other to press a spring leaf into the form to which said dies have been arranged.

9. A spring-forming device comprising, in combination, a frame, three sliding cross-bar members mounted upon said frame, the middle cross-bar being movable relative to the other cross-bars and said other cross-bars being immovable relative to each other, toggle means connected between the top movable one of said cross-bars and the middle bar to provide for the pressure between the bars to shape hot plates to form, a vertically sliding bar, link means connecting said vertically sliding bar with said toggle means, a plurality of adjustable die members carried by the third cross-bar member to provide any suitable form to which it is desirable to press a heated spring leaf and resiliently supported self-adjusting spring-pressing members carried by said middle bar to be moved toward said third bar to press the spring leaf into the form presented by said die members, one of said resiliently supported members having a lost motion connection with said vertically sliding bar and an automatic adjustment to take up said lost motion.

10. A spring-forming device including means providing an adjustable form to which a spring leaf may be shaped, resiliently supported jaw means for engagement with the central portion of the spring and a resiliently mounted member at each side of said jaw means tipped at an angle so as to make a sliding contact with the spring leaf thereby to prevent bulging of the leaf at the space between the jaw means and relilently mounted members, said jaw means adapted to rest by gravity upon said spring leaf while said other members are pressing the spring against said form and means for engagement with said jaw means upon completion of the pressing action of said other members thereby to press said jaw means tightly against the central portion of the spring leaf.

11. A spring-forming device comprising, in combination, an upright frame, three cross-bar members arranged upon said frame, the upper and lower bars being immovable relative to each other while the middle bar is movable relative to the others, spring-forming means provided by the middle and lower bars, toggle means connecting the middle and upper bars and means acting upon said toggle means for sliding said middle bar toward and away from said lower bar thereby to form a spring leaf in the spring-forming means.

12. A spring-forming device having adjustable die members for providing a form against which a spring leaf may be pressed, means supporting said die members, means whereby each die may be adjusted independently and means whereby all of said dies may be returned from an adjusted position to a normal position by a single operation.

13. A spring-forming device having adjustable die members for providing a form against which a spring leaf may be pressed, means supporting said die members, rack and pinion means for raising and lowering the dies, ratchet and pawl means for holding the dies in adjusted positions and pawl-releasing means acting upon all of the pawls at one time to lower all of the dies by a single movement of the pawl-releasing means.

14. A spring-forming device having adjustable die members for providing a form against which a spring leaf may be pressed, means for supporting said die members, a plurality of spring-pressing members for forcing a heated spring leaf against said die members, a support for said spring-pressing members, a block carried by said support, a rod having one end slidable in said block, one of said spring-pressing members slidable in said block, and latch means carried by said rod for engagement with said spring-pressing member to lock said rod and said sliding member together and force said sliding member against the spring leaf subsequent to said other spring-pressing members being pressed against the spring leaf.

15. A spring-forming device comprising, in combination, an upright frame, three cross-bar members arranged upon said frame, the upper and lower bars being immovable relative to each other while the middle bar is movable relative to the others, spring-pressing members carried by said middle bar, one of said spring-pressing members being slidably mounted relative to said bar, toggle means connecting the middle and upper bars, an operating rod having one end slidable relative to said middle bar and the slidably mounted member, means for driving said operating rod, latch means carried by said upper bar and engageable with said frame to prevent movement of said upper bar when said toggle means is operated to move said middle bar toward the lower bar, said latch means being adapted to be released by said toggle means, a latch carried by said operating rod for engagement with said slidable spring-pressing member at a predetermined time before the latch means have been unlatched by the toggle means thereby to move said slidable spring-pressing member with said operating rod so that it may be moved toward said lower bar during the unlatching operation.

16. A spring-forming device having a plurality of independent spring-bending members, a support for said members, each member presenting a shoe for engagement with the spring leaf, a spring suspension between the shoe and the support, and a link between the shoe and the spring suspension to permit crawling movement of said shoe when being pressed against a spring leaf.

17. A spring-forming device having a plurality of independent spring-bending members, a support for said members, each member presenting a flexible shoe normally positioned so that one end of the shoe will contact with a spring leaf first when being pressed against the leaf, a spring suspension between the shoe and the support, a pivoted link between the spring suspension and the support and a link connecting the upper end of the shoe with one end of the spring suspension to assist in the crawling action between the shoe and the spring leaf when the shoe is pressed against the leaf thereby to permit the shoe to conform to the curve of the spring leaf.

18. A spring-forming device including means providing an adjustable form to which a spring leaf may be shaped, a plurality of self-adjusting resiliently mounted spring-pressing members, means for adjusting said members toward and away from each other, each member adapted to press a portion of the spring leaf against said form independently of the form which the other member or members may assume and each member adapted to conform substantially with said form when the spring leaf is fully compressed, relatively movable members for supporting said form-providing means and said spring-pressing members and means for moving said relatively movable members together to clamp the spring between the spring-forming devices.

19. A spring-forming device including means providing a form to which a spring leaf is to be shaped, a spring-pressing member including a shoe portion resiliently mounted so as to make a sliding contact with a spring leaf when the leaf is being pressed between the means providing the form and the spring-pressing member, and adjusting means whereby said spring-pressing member may be moved lengthwise relative to the means providing the form.

20. A spring-forming device including form means to which a spring leaf may be shaped, spring-pressing jaw means for engagement with a spring leaf to press it tightly against the form means, a support for said jaw means, said jaw means being normally slidable relative thereto and lost motion means cooperating with said support to lock said jaw means against sliding movement relative to said support.

21. A spring-bending member for spring-forming devices comprising, in combination, a jointed flexible shoe formed by a number of associated links, a carrier, a spring suspension between the carrier and the shoe, and a link pivotally connecting the shoe and the spring suspension.

22. A spring-bending member for spring-forming devices comprising, in combination, a jointed flexible shoe formed by a number of associated links, a carrier, a spring suspension between the carrier and the shoe, and a link pivotally connecting the spring suspension and the carrier.

23. A spring-bending member for spring-forming devices comprising, in combination, a flexible shoe, a carrier, a spring suspension between the carrier and the shoe, a link pivotally connecting the shoe and the spring suspension, and a link pivotally connecting the spring suspension and the carrier to permit lengthwise shifting movement of the shoe relative to the carrier.

24. A spring-bending member for a spring-forming device comprising a spring-bending shoe, a carrier for said shoe, a spring suspension between the shoe and the carrier, pivotal link means connecting the shoe and spring suspension and other pivotal link means connecting the spring suspension and carrier to permit lengthwise movement of the shoe relative to the carrier.

25. In a leaf spring-forming machine a presser member formed by a number of associated pivotal links and adapted for applying pressure to a spring being formed, said presser being mounted for creeping movement while applying pressure to the spring.

26. In a leaf spring forming machine, flexible pressers for applying pressure to a spring being formed, a support for said pressers, spring suspension means located between the support and pressers to permit creeping movement of said pressers while applying pressure to the spring, and adjusting means for moving said pressers toward or away from one another to accommodate the pressers to springs of various lengths.

27. In a spring leaf forming machine, a plurality of pivoted die members attached to vertically adjustable means carried by a support, said dies being adapted to adjust themselves to the spring being formed, means permitting free adjustment of the vertically adjustable means in one direction so that all the dies may be quickly positioned to provide a form to which it is desired to press a spring, said means preventing movement of the dies in the opposite direction.

28. In a spring leaf forming machine, a plurality of pivoted die members adapted to adjust themselves to the spring being formed, means permitting free adjustment of the die members in one direction so that all the dies may be quickly positioned to provide a form to which it is desired to press a spring, said means preventing movement of the dies in the opposite direction, and means whereby said dies may be released one at a time or collectively.

29. A spring forming machine including a spring pressing mechanism for forming a leaf spring, supporting means for said mechanism, latch means for holding said pressing mechanism in a fixed relation to said supporting means, operating means for reciprocating a portion of said pressing mechanism to provide for forming a spring leaf, said operating mechanism being adapted to release said latch means and permit sliding movement of said pressing mechanism relative to said supporting means subsequent to forming the leaf spring.

30. A spring forming machine including form means, presser means for pressing a spring leaf to conform with said form means, locking means for locking said form means and presser means together when the spring leaf has been pressed therebetween and means for unlocking said locking means upon a predetermined movement of said forming and pressing means as a unit.

31. In a leaf spring forming machine, spring forming mechanism for pressing spring leaves, means for operating the spring forming mechanism to press a spring in the mechanism and for moving the mechanism into a tempering bath, and locking means for locking the operating means against operation except when the operator releases the locking means.

32. A spring-forming device comprising, in combination, a frame, three sliding cross-bar members mounted upon said frame, the middle cross-bar being movable relative to the other cross-bars and said other cross-bars being immovable relative to each other, toggle means connected between one of said cross-bars and the middle bar to provide the pressure necessary to form the spring leaf, a sliding bar, links connecting said sliding bar with said toggle means, a plurality of adjustable die members carried by the third cross-bar member to provide any suitable form to which it is desirable to press a heated spring leaf and resiliently supported self-adjusting spring-pressing members carried by said middle bar to be moved toward said third bar to press the spring leaf into the form presented by said die members, and means carried by said sliding bar for engagement with one of said resiliently supported members upon a given movement of said bar.

33. A spring-forming device comprising a supporting frame, a pair of crossbar members supported by said frame, means operable to move one crossbar member relative to the other, a number of adjustable form elements carried by one of said crossbar members, means whereby each form element may be adjusted independently of the others to provide for any desired shape to which a spring leaf may be bent, locking means operable to lock the form elements in various adjusted positions and yieldable spring leaf bending means carried by the other crossbar member for pressing a spring leaf to the shape provided by the form elements.

In testimony whereof, I have signed my name to this specification.

CARL PETERSON.